(12) United States Patent
Shimokoba et al.

(10) Patent No.: US 8,557,905 B2
(45) Date of Patent: Oct. 15, 2013

(54) HEAT-DISSIPATING RESIN COMPOSITION USED FOR LED LIGHT HOUSING AND HEAT-DISSIPATING HOUSING FOR LED LIGHTING

(75) Inventors: Yuichi Shimokoba, Ichihara (JP); Tetsuo Noguchi, Ichihara (JP); Satoshi Ishii, Tokyo (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/637,441

(22) PCT Filed: Mar. 25, 2011

(86) PCT No.: PCT/JP2011/057366
§ 371 (c)(1),
(2), (4) Date: Sep. 26, 2012

(87) PCT Pub. No.: WO2011/125545
PCT Pub. Date: Oct. 13, 2011

(65) Prior Publication Data
US 2013/0030105 A1 Jan. 31, 2013

(30) Foreign Application Priority Data
Apr. 7, 2010 (JP) ................................. 2010-088288

(51) Int. Cl.
*C08K 3/38* (2006.01)
(52) U.S. Cl.
USPC ............................ 524/404; 524/436; 524/437
(58) Field of Classification Search
USPC ......................... 524/404, 436, 437
See application file for complete search history.

(56) References Cited
U.S. PATENT DOCUMENTS
2003/0181560 A1  9/2003  Kawaguchi et al.

FOREIGN PATENT DOCUMENTS

| JP | 2002-69309 | 8/2002 |
|---|---|---|
| JP | 2004-26982 | 1/2004 |
| JP | 2004-59638 | 2/2004 |
| JP | 2006-117814 | 5/2006 |
| JP | 2008-33147 | 2/2008 |
| JP | 2008-195766 | 8/2008 |
| JP | 2008-270709 | 11/2008 |
| JP | 2009-167358 | 7/2009 |
| WO | WO 2009/012933 | 1/2009 |
| WO | WO 2011/074552 | * 6/2011 |

OTHER PUBLICATIONS

International Search Report; Application No. PCT/JP2011/057366; Form PCT/ISA/2010 (4 pages).

* cited by examiner

Primary Examiner — Peter Szekely
(74) Attorney, Agent, or Firm — Stein IP, LLC

(57) ABSTRACT

Provided is a novel heat-dissipating resin composition used for an LED light housing, the composition having excellent heat dissipation, fire retardancy, insulation properties, and molding processability as well as low specific gravity and improved whiteness. Also provided is a heat-dissipating housing for LED lighting, the housing being molded using the heat-dissipating resin composition. Disclosed is a heat-dissipating resin composition used for an LED light housing, comprising: 100 parts by mass of a thermoplastic resin composition (X) comprising 40 to 65% by mass of a polyamide resin (A), 33.5 to 59.8% by mass of a metal-hydroxide-based fire retardant (B), and 0.2 to 1.5% by mass of a polytetrafluoroethylene resin (C); and 5 to 200 parts by mass of an inorganic filler (Y) comprising 5 to 100% by mass of boron nitride (D) and 0 to 95% by mass of an inorganic oxide filler (E), wherein thermal conductivity is equal to or greater than 1.0 W/m·K. Also, disclosed is a heat-dissipating housing for LED lighting, the housing being molded using the heat-dissipating resin composition.

22 Claims, 3 Drawing Sheets

A.

B.

D: diameter
Unit: [mm]

C.

D.

D: diameter
Unit: [mm]

E.

F.

G.

HEAT-DISSIPATING RESIN COMPOSITION USED FOR LED LIGHT HOUSING AND HEAT-DISSIPATING HOUSING FOR LED LIGHTING

CROSS-REFERENCE TO RELATED APPLICATIONS

This application is a national stage application of PCT Application No. PCT/JP2011/057366, filed Mar. 25, 2011, which claims the benefit of Japanese Application No. 2010-088288, filed Apr. 7, 2010, in the Japanese Intellectual Property Office, the disclosures of which are incorporated herein by reference.

BACKGROUND OF THE INVENTION

1. Field of the Invention

The present invention relates to heat-dissipating resin compositions used for an LED light housing and a heat-dissipating housing for LED lighting.

2. Description of the Related Art

Conventionally, metallic aluminum has been used as a heat-dissipating material for an LED light housing. Since metallic aluminum has markedly low thermal emittance, the housing is subjected to alumite treatment, coating, or processing into a fin configuration so as to impart higher thermal emittance. Unfortunately, this results in low productivity and increased cost. Consequently, there is an increasing demand for an injection molding product using a thermoplastic resin having excellent productivity as an alternative for metallic aluminum. The thermoplastic resin, however, has markedly lower heat conductance than metallic aluminum, so that the thermoplastic resin has poorer heat dissipation. In order to use the resin as a heat-dissipating material for an LED light housing, heat conductance should be imparted to the resin for possible usage. As a process for imparting heat conductance to a thermoplastic resin, a process has been reported that combines a high thermal conductive filler (Patent Documents 1 to 6). The LED light housing, however, requires fire retardancy, insulation properties, and good molding processability in addition to heat dissipation. No thermoplastic resin satisfying all the above requirements exists. Thus, it has not been achieved to produce an LED light housing made of a resin. In addition, there have been recent demands for lowering the weight of the housing by using a resin and for creating beautiful white appearance.

PATENT DOCUMENT

[Patent Document 1] JP2002-069309A
[Patent Document 2] JP2004-059638A
[Patent Document 3] JP2008-033147A
[Patent Document 4] JP2008-195766A
[Patent Document 5] JP2008-270709A
[Patent Document 6] JP2006-117814A

SUMMARY OF THE INVENTION

It is an object of the present invention to provide a novel heat-dissipating resin composition used for an LED light housing, the composition having excellent heat dissipation, fire retardancy, insulation properties, and molding processability as well as low specific gravity and improved whiteness. It is also another object of the present invention to provide a heat-dissipating housing for LED lighting, the housing being molded using the heat-dissipating resin composition.

Additional aspects and/or advantages of the invention will be set forth in part in the description which follows and, in part, will be obvious from the description, or may be learned by practice of the invention.

An aspect of the present invention provides a heat-dissipating resin composition used for an LED light housing, the composition comprising: 100 parts by mass of a thermoplastic resin composition (X) comprising 40 to 65% by mass of a polyamide resin (A), 33.5 to 59.8% by mass of a metal-hydroxide-based fire retardant (B), and 0.2 to 1.5% by mass of a polytetrafluoroethylene resin (C); and 5 to 200 parts by mass of an inorganic filler (Y) comprising 5 to 100% by mass of boron nitride (D) and 0 to 95% by mass of an inorganic oxide filler (E), wherein a thermal conductivity of the composition is equal to or greater than 1.0 W/m·K.

The present inventors have conducted intensive research so as to produce a resin composition having excellent heat dissipation, fire retardancy, insulation properties, and molding processability as well as low specific gravity and improved whiteness, and have found that a resin composition having the above desirable characteristics can be produced by including the above proportions of a polyamide resin, a metal-hydroxide-based fire retardant, a polytetrafluoroethylene resin, and boron nitride. The present inventors then have completed the present invention.

The investigation according to the present inventors has revealed that when another resin is used as an alternative for the polyamide resin, molding processability and fire retardancy are deteriorated. Hence, use of the polyamide resin is proved to be indispensable. In addition, when a fire retardant other than the metal-hydroxide-based fire retardant is used, any of molding processability, fire retardancy, and heat conductance is deteriorated. This indicates essential use of the metal-hydroxide-based fire retardant. Further, when an anti-drip agent other than the polytetrafluoroethylene resin is used, molding processability and fire retardancy are deteriorated. This indicates essential use of the polytetrafluoroethylene resin. Moreover, when boron nitride is not included or an inorganic filler other than boron nitride is solely used, heat conductance is markedly deteriorated. This indicates essential use of boron nitride. In view of the above consideration, it has been found essential to include all the four components including a polyamide resin, a metal-hydroxide-based fire retardant, a polytetrafluoroethylene resin, and boron nitride so as to produce a resin composition having the above desirable characteristics.

Additionally, their component content has been examined. When the metal-hydroxide-based fire retardant, the polytetrafluoroethylene resin, or the inorganic filler has a content higher than the above upper limit, for example, molding processability is deteriorated. Hence, it has been found essential to keep the component content at the above upper limit or less so as to produce a resin composition having the desirable characteristics. Also, when the metal-hydroxide-based fire retardant or the polytetrafluoroethylene resin has a content lower than the above lower limit, fire retardance is deteriorated. Hence, it has been found essential to keep the component content at the above lower limit or more so as to produce a resin composition having the desirable characteristics.

In view of the above, the above desirable characteristics have been found to be achieved by including the above four components at the above component composition.

Hereinafter, various embodiments of the present invention are described. The following various embodiments can be combined one another.

Preferably, the boron nitride (D) has a volume-average particle diameter of from 5 to 25 μm as determined by a laser diffraction and scattering method.

Preferably, the boron nitride (D) has a graphitization index (GI) of 4 or less as determined by powder X-ray diffractometry.

Preferably, the inorganic filler (Y) comprises 10 to 90% by mass of the boron nitride (D) and 10 to 90% by mass of the inorganic oxide filler (E).

Preferably, the inorganic oxide filler (E) has a volume-average particle diameter of from 0.1 to 1 μm as determined by a laser diffraction and scattering method.

Preferably, the metal-hydroxide-based fire retardant (B) is magnesium hydroxide.

Preferably, the inorganic oxide filler (E) is titanium oxide.

An aspect of the present invention provides a heat-dissipating housing for LED lighting, comprising the above-described heat-dissipating resin composition, wherein the housing is molded using the composition. Preferably, the heat-dissipating housing for LED lighting is an injection molding product.

A heat-dissipating resin composition according to embodiments of the present invention has increased thermal conductivity, thermal emittance, volume-specific resistance, and lightness (L*) as well as excellent fire retardancy, low specific gravity, and superior molding processability. Thus, when used for an LED light housing, the composition can exert the following effects.

(i) Heat is transferred from a heat-generating portion of an LED member to the housing, thereby emitting heat from the entire housing. This can reduce accumulation of heat in the LED member and can prevent damage due to LED heat.
(ii) The housing member has good heat emittance, which can reduce a temperature increase in the housing member and can prevent accidents such as a burn caused by contact with the housing.
(iii) The composition has good fire retardancy and insulation properties, and is highly safe.
(iv) The housing weighs light.
(v) The composition has excellent molding processability, and its use allows injection molding to be performed. Hence, the composition has superior productivity.
(vi) It is possible to produce a beautiful white heat-dissipating housing.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 1A is a top view. FIG. 1B is a side view.

FIG. 2C is a top view. FIG. 2D is a side view. FIG. 2E is a bottom view.

FIG. 3F is a top view. FIG. 3G is side views.

DETAILED DESCRIPTION OF THE EMBODIMENTS

Figure 1:
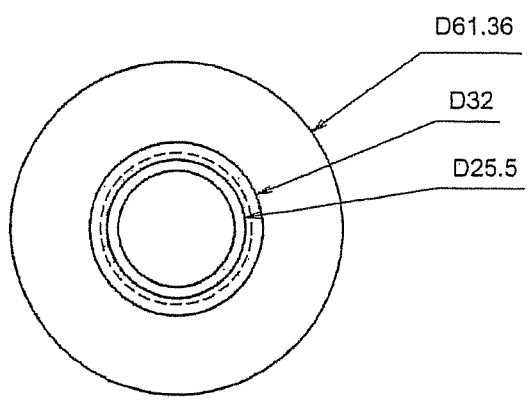
FIG. 1 illustrates an LED light housing.
Figure 1:
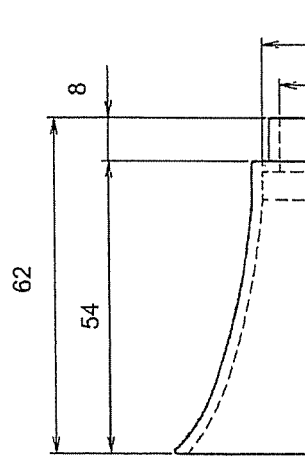

Reference will now be made in detail to the present embodiments of the present invention, examples of which are illustrated in the accompanying drawings, wherein like reference numerals to the like elements throughout. The embodiments are described below in order to explain the present by referring to the figures.

Although a few embodiments of the present invention have been shown and described, it would be appreciated by those skilled in the art that changes may be made in this embodiment without departing from the principles and spirit of the invention, the scope of which is defined in the claims and their equivalents.

As used herein, the term "to" means an extent from "a value or more" to "a value or less". For example, the phrase "A to B" means an extent from A or more to B or less. In addition, the term "comprising" includes the terms "essentially consisting of" and "consisting of".

The following details embodiments of the present invention.

A polyamide resin (A) refers to a resin comprising a monomer having an amide bond (—CO—NH—) in its main chain. Examples of the polyamide resin (A) include an aliphatic polyamide, an aromatic polyamide, and an alicyclic polyamide. Specific examples include nylon 4, nylon 6, nylon 8, nylon 11, nylon 12, nylon 4,6, nylon 6,6, nylon 6,10, nylon 6,12, nylon 6T, nylon 6/6,6, nylon 6/12, nylon 6/6T, and nylon 6/61.

The polyamide resin (A) is a polar polymer having an amide bond, so that the resin has a high affinity for a metal-hydroxide-based fire retardant (B), boron nitride (D) having an amino group and/or a hydroxy group at its interface, and an inorganic oxide filler (E). Accordingly, the highly concentrated polyamide resin (A) can be incorporated.

In view of its availability, molding processability, and affinity for the metal-hydroxide-based fire retardant (B), boron nitride (D), and inorganic oxide filler (E), nylon 6, nylon 6,6, or nylon 12 is preferably used for the polyamide resin (A).

Nylon 6 refers to a resin comprising repeating units represented by formula (1). Nylon 6,6 refers to a resin comprising repeating units represented by formula (2). Nylon 12 refers to a resin comprising repeating units represented by formula (3). Note that the "n" means a degree of polymerization.

[Formula 1]

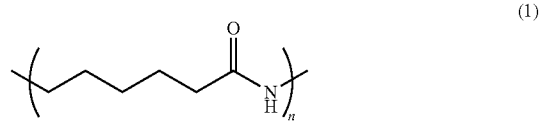

(1)

[Formula 2]

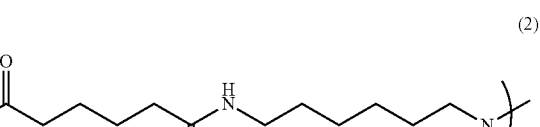

(2)

[Formula 3]

(3)

In view of its strength and characteristics of extrusion kneading with boron nitride and other substances, the polyamide resin (A) has a weight-average molecular weight of preferably from 5000 to 250000, more preferably from 6000 to 240000, and still more preferably from 7000 to 230000. In view of its strength and characteristics of extrusion kneading with boron nitride and other substances, the polyamide resin (A) has a number-average molecular weight of preferably from 5000 to 50000, more preferably from 5200 to 48000, and still more preferably from 5500 to 45000. As used herein, the weight-average molecular weight and the number-average molecular weight mean a value as determined by using gel permeation chromatography (e.g., a GPC apparatus manufactured by Nihon Waters K. K.).

Examples of the metal-hydroxide-based fire retardant (B) include magnesium hydroxide and aluminum hydroxide. In view of its thermostability during molding, magnesium hydroxide is preferably used.

The metal-hydroxide-based fire retardant (B) exerts an effect of improving thermal conductivity in addition to an effect as a fire retardant for resin. From a viewpoint of imparting heat dissipation properties, the metal-hydroxide-based fire retardant (B) is a suitable fire retardant.

The polytetrafluoroethylene resin (C) refers to a fluorocarbon resin comprising a monomer containing fluorine atoms and carbon atoms, the monomer being represented by formula (4). Note that the "n" means a degree of polymerization.

[Formula 4]

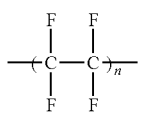

(4)

The polytetrafluoroethylene resin (C) has an effect as an anti-drip agent. When combined with the metal-hydroxide-based fire retardant (B), the polytetrafluoroethylene resin (C) is effective in giving the UL94 standard the grade "V-1" or "V-0".

The boron nitride (D) is a compound comprising a nitrogen atom and a boron atom, the compound being represented by the chemical formula BN. Examples of the boron nitride (D) include hexagonal boron nitride (h-BN) in which two hexagonal mesh layers arranged differently from each other are repeatedly laminated, rhombohedral boron nitride (r-BN) in which three hexagonal mesh layers arranged differently from one another are repeatedly laminated, turbostratic boron nitride (t-BN) in which hexagonal mesh layers are laminated at random, amorphous boron (a-BN) which is amorphous, and cubic boron nitride (c-BN) which has a high-pressure phase. Preferably, the hexagonal boron nitride (h-BN) is used.

The boron nitride (D) is a scale-like crystal and an inorganic filler having remarkably high thermal conductivity. When included in a resin, the boron nitride (D) can efficiently increase its thermal conductivity. In addition, the boron nitride (D) is suitable for achieving a high degree of whiteness.

Examples of the inorganic oxide filler (E) include titanium oxide, alumina, silica, zinc oxide, and magnesium oxide. In view of its molding processability, the inorganic oxide filler (E) has a volume-average particle diameter, which is determined by a laser diffraction and scattering method, of preferably from 0.1 to 1 µm and more preferably from 0.2 to 0.5 µm. Also, in order to achieve a high degree of whiteness, it is particularly preferred to use titanium oxide. A surface modifier such as a silane-based or titanate-based coupling agent can be used for the inorganic oxide filler (E).

A heat-dissipating resin composition according to an embodiment of the present invention comprises: 100 parts by mass of a thermoplastic resin composition (X) comprising a polyamide resin (A), a metal-hydroxide-based fire retardant (B), and a polytetrafluoroethylene resin (C); and 5 to 200 parts by mass of an inorganic filler (Y) comprising boron nitride (D) and an inorganic oxide filler (E). Preferred are 15 to 100 parts by mass of the inorganic filler (Y). If the inorganic filler (Y) contains 5 parts by mass or more, good thermal conductivity can be achieved. If the inorganic filler (Y) contains 200 parts by mass or less, good thermal emittance, good molding processability, and low specific gravity can be achieved.

A thermoplastic resin composition (X) according to an embodiment of the present invention comprises 40 to 65% by mass of a polyamide resin (A), 33.5 to 59.8% by mass of a metal-hydroxide-based fire retardant (B), and 0.2 to 1.5% by mass of a polytetrafluoroethylene resin (C). Preferably, the thermoplastic resin composition (X) comprises 45 to 64% by mass of a polyamide resin (A), 35.3 to 54.6% by mass of a metal-hydroxide-based fire retardant (B), and 0.4 to 0.7% by mass of a polytetrafluoroethylene resin (C). If the polyamide resin (A) contains 40% by mass or more, good thermal emittance and molding processability can be achieved. If the polyamide resin (A) contains 65% by mass or less, good thermal conductivity and fire retardancy can be achieved. If the metal-hydroxide-based fire retardant (B) contains 33.5% by mass or more, good thermal conductivity and fire retardancy can be achieved. If the metal-hydroxide-based fire retardant (B) contains 59.8% by mass or less, good thermal emittance and molding processability can be achieved. If the polytetrafluoroethylene resin (C) contains 0.2% by mass or more, good fire retardancy can be achieved. If the polytetrafluoroethylene resin (C) contains 1.5% by mass or less, good molding processability can be achieved.

An inorganic filler (Y) according to an embodiment of the present invention comprises 5 to 100% by mass of boron nitride (D) and 0 to 95% by mass of an inorganic oxide filler (E). Preferably, the inorganic filler (Y) comprises 10 to 90% by mass of boron nitride (D) and 10 to 90% by mass of an inorganic oxide filler (E). More preferably, the inorganic filler (Y) comprises 30 to 70% by mass of boron nitride (D) and 30 to 70% by mass of an inorganic oxide filler (E). If the boron nitride (D) contains 5% by mass or more, good thermal conductivity can be achieved.

A heat-dissipating resin composition according to an embodiment of the present invention has a thermal conductivity of 1.0 W/m·K or greater, preferably 1.5 W/m·K or greater, and more preferably 2.0 W/m·K or greater. If the thermal conductivity is equal to or greater than 1.0 W/m·K, heat is transferred from a heat-generating portion of an LED member to a housing, thereby emitting heat from the housing. This can prevent damage due to LED heat.

If the thermal conductivity is equal to or greater than 1.0 W/m·K, the heat-dissipating resin composition has no particular limitation. In order to achieve good thermal conductivity, the boron nitride (D) has a volume-average particle diameter of preferably from 5 to 25 µm and more preferably from 10 to 20 µm. Note that the volume-average particle diameter can be determined by a laser diffraction and scattering method.

In order to achieve better thermal conductivity, the boron nitride (D) used has a graphitization index (GI), which is determined by powder X-ray diffractometry, of preferably 4 or less and more preferably 2 or less. The GI can be estimated by using an integrated intensity ratio, namely an area ratio, as determined using (100), (101), and (102) lines in an X-ray diffraction diagram (J. Thomas, et. al., J. Am. Chem. Soc. 84, 4619 (1962)).

GI=[Area{(100)+(101)}]/[Area(102)].

The boron nitride (D) can be prepared as follows: a calcium (Ca) compound is added to a mixture containing boric acid and melamine at a B/N atom ratio of 1/1 to 1/6 to produce a liquid phase of calcium borate $(CaO)_X \cdot B_2O_3$ ($X \leq 1$) at an internal proportion of 5 to 20% by mass per boron nitride generated by crystallization; next, melamine borate is made to be formed while keeping a temperature T (° C.), a relative humidity Ψ (%), and a retention time t (hr) under conditions satisfying the following equation; and then, the melamine borate is subjected to calcination and crystallization under a non-oxidation gas atmosphere at a temperature of 1800 to 2200° C., followed by grinding.

$T \geq -20 \cdot \log_{10}(t/4) + \{(\Psi-100)^2/20\} + 60$.

Boric acid is a compound represented by a general formula $(B_2O_3) \cdot (H_2O)_X$ (X=0 to 3) such as orthoboric acid ($H_3BO_3$), metaboric acid ($HBO_2$), tetraboric acid ($H_2B_4O_7$), and anhydrous boric acid ($B_2O_3$). One or two or more types of boric acid may be used. Among them, it is preferable to use ofthoboric acid, which is readily available and can be mixed well with melamine.

Melamine ($C_3N_6H_6$) is a kind of an organic compound that is an organic nitrogen compound having a triazine ring in its structural center and 3 amino groups as side chains as represented by formula (5).

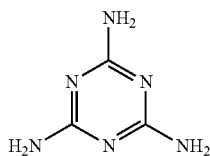

(5)

Boric acid and melamine can be mixed by using a common mixer such as a ball mill, a ribbon blender, and a Henschel mixer.

Regarding a combination proportion between boric acid and melamine, boron atoms of boric acid and nitrogen atoms of melamine have a B/N atom ratio of 1/1 to 1/6. In view of GI, the ratio is preferably from 1/2 to 1/4. If the ratio exceeds 1/1, a marked amount of unreacted boric acid remains after calcination. If the ratio is lower than 1/6, a marked amount of unreacted melamine sublimates during calcination.

A Ca compound is added beforehand to a mixture containing boric acid and melamine to produce a liquid phase of calcium borate $(CaO)_X \cdot B_2O_3$ ($X \leq 1$), which is a crystallization catalyst for the boron nitride (D), at an internal proportion of 5 to 20% by mass per boron nitride generated by crystallization. Then, the above mixture is kept under an atmosphere in which a temperature T (° C.), a relative humidity Ψ (%), and a retention time t (hr) satisfy the following equation to produce melamine borate. If any of the temperature (T), the relative humidity (Ψ), and the retention time (t) is out of the range set forth in the following equation, melamine borate is not going to be formed.

$T \geq -20 \cdot \log_{10}(t/4) + \{(\Psi-100)^2/20\} + 60$.

Such an atmosphere can be easily created by using a constant temperature and humidity chamber, a steam furnace, or other equipment. A specific example of the temperature, the relative humidity, and the time is 80° C., 80%, and 10 hours, respectively. Examples of atmosphere-forming gas other than water vapor include, but are not particularly limited to, atmospheric gas, nitrogen gas, and inert gas.

The Ca compound may be solid calcium borate. Preferred is a compound capable of generating calcium borate by reacting with boric acid. Particularly preferred is calcium carbonate ($CaCO_3$), which is readily available and inexpensive. When calcium carbonate is used, it is necessary that boric acid functions not only as a source material for boron nitride but also as a source material for calcium borate in a liquid phase. However, it is required to use a much less amount of the boric acid used as a source material for calcium borate in a liquid phase than that of the boric acid used as a source material for boron nitride. Accordingly, even if calcium carbonate is used, boric acid and melamine ($C_3N_6H_6$) may have a combination proportion as follows: when the boric acid is orthoboric acid ($H_3BO_3$), $H_3BO_3/C_3N_6H_6$ may have a molar ratio of from 6/1 to 1/1 and may have a mass ratio of from 2.94/1 to 0.49/1.

In order to produce a liquid phase of calcium borate $(CaO)_X \cdot B_2O_3$ ($X \leq 1$) at an internal proportion of 5 to 20% by mass per boron nitride generated by crystallization, a specific combination proportion of calcium carbonate is required to be appropriately modified depending on a calcination process because use of different calcination processes results in a change in a volatilization volume of melamine and/or a mole number of boric acid that reacts with 1 mol of melamine. If no melamine volatilizes and 1 mol of melamine always reacts with 2 mol of boric acid to generate boron nitride, a specific proportion of combination of boric acid, melamine, and calcium carbonate may be 22.3 to 99.7/10.1 to 48.2/0.1 to 1.0 as a molar ratio and 13.8 to 61.6/12.7 to 60.7/0.1 to 1.0 as a mass ratio.

By adding the Ca compound before retention, the compound can be mixed uniformly in melamine borate. The Ca compound is to be ununiformly mixed when boric acid, melamine, and the Ca compound are just mechanically mixed, when the Ca compound is mixed after formation of melamine borate, or when water is added to boric acid, melamine, and the Ca compound to simultaneously produce melamine borate while mixing the Ca compound. Consequently, boron nitride after crystallization becomes heterogeneous material substantially containing coarse particles or microparticles whose crystals have not been developed.

Calcium borate $(CaO)_X \cdot B_2O_3$ ($X \leq 1$) remains a liquid phase at crystallization temperatures. Amorphous boron nitride is dissolved into this liquid phase. When an amount of dissolution reaches a supersaturation point, boron nitride is to be precipitated. When an amount of catalyst, namely a liquid phase volume, is large at this occasion, coarse particles are likely to be generated because of a large distance between adjacent boron nitride particles. In contrast, when a liquid phase volume is small, microparticles whose crystals have not been developed are likely to be generated because amorphous boron nitride has a less amount of dissolution. Meanwhile, a catalyst composition, that is, a molar ratio of CaO to $B_2O_3$ is involved with a particle shape. When X is 1 or less, that is, in the case of a $B_2O_3$-rich composition, boron nitride particles generated develop into a scale-like shape. In contrast, when X is larger than 1, that is, in the case of a CaO-rich composition, agglomerate may be generated in the case of a relatively small amount of catalyst. In addition, in the case of a relatively large amount of catalyst, particles with a larger thickness are likely to be generated.

Examples of gas that can be used to create a non-oxidation gas atmosphere include nitrogen gas, ammonia gas, hydrogen gas, hydrocarbon gas (e.g., methane, propane), and noble gas (e.g., helium, argon). Among them, preferred is nitrogen gas, which is readily available and inexpensive. Besides, the nitrogen gas exerts a marked effect of inhibiting decomposition of boron nitride at a high temperature range from 2000 to 2200° C.

The calcination and crystallization can be carried out under a non-oxidation gas atmosphere at temperatures from 1800 to 2200° C. If the temperature is lower than 1800° C., insufficient crystallization occurs. Accordingly, highly crystallized boron nitride cannot be obtained. Also, if the temperature exceeds 2200° C., boron nitride is decomposed.

Examples of a calcination furnace used include batch furnaces (e.g., a muffle furnace, a tubular furnace, an atmosphere furnace) and continuous furnaces (e.g., a rotary kiln, a screw conveyor furnace, a tunnel kiln, a belt furnace, a pusher furnace, a vertical continuous furnace). The furnace is used depending on its purpose. For example, when a small amount of various types of boron nitride is produced, a batch furnace should be used. When a large amount of a certain type of boron nitride is produced, a continuous furnace should be employed.

The boron nitride (D) undergoes, depending on its need, a tail-end process such as grinding, classification, removal (purification) of a residual catalyst by acid treatment, washing, and drying. After that, the boron nitride is used in practice.

In view of heat dissipation efficiency, a heat-dissipating resin composition used for an LED light housing has thermal emittance of preferably 0.70 or more, more preferably 0.75 or more, and still more preferably 0.80 or more.

The heat-dissipating resin composition used for an LED light housing has fire retardancy of grade V-1 or better according to the UL94 standard. Particularly preferred is grade V-0.

In view of reducing the weight, the heat-dissipating resin composition used for an LED light housing has a specific gravity of preferably 2.50 (g/cm$^3$) or less, more preferably 2.20 (g/cm$^3$) or less, and still more preferably 1.90 (g/cm$^3$) or less.

The heat-dissipating resin composition used for an LED light housing requires a high degree of whiteness, and has a lightness (L*) of preferably 85 or higher, more preferably 88 or higher, and still more preferably 90 or higher.

In view of safety, the heat-dissipating resin composition used for an LED light housing requires insulation properties, and has a volume-specific resistance value of preferably $10^{12}$ or higher, more preferably $10^{13}$ or higher, and still more preferably $10^{14}$ or higher.

A heat-dissipating resin composition according to an embodiment of the present invention may contain additives (e.g., a lubricant, antioxidant, photo stabilizer, UV absorber, antistatic agent, glass fiber, inorganic filler, colorant) unless advantageous effects of the present invention are impaired.

A heat-dissipating resin composition according to an embodiment of the present invention can be produced using a common melt kneading device. Examples of the device include screw extruders (e.g., a single-screw extruder, an intermeshing co-rotating or counter-rotating twin-screw extruder, a non- or closely-intermeshing twin-screw extruder).

A known molding process can be used for a process for manufacturing a heat-dissipating housing for LED lighting, the housing being molded using a heat-dissipating resin composition according to an embodiment of the present invention. The process does not have any particular limitation. Examples of the process include injection molding, extrusion, press molding, vacuum molding, and blow molding. In view of its productivity, preferred is the injection molding.

Hereinafter, detailed contents are described by using Examples. The present invention, however, is not limited to the following Examples.

The following polyamide resins (A) were used.

A-1: nylon 6; manufactured by Ube Industries, Ltd.; product name "1013B"; a specific gravity of 1.14 g/cm$^3$.

A-2: nylon 6,6; manufactured by TOYOBO CO., LTD.; product name "T-662"; a specific gravity of 1.14 g/cm$^3$.

A-3: nylon 12; manufactured by ARKEMA, LTD.; product name "AMNOTLD"; a specific gravity of 1.01 g/cm$^3$.

The following metal-hydroxide-based fire retardants (B) were used.

B-1: magnesium hydroxide; manufactured by Konoshima Chemical Co., Ltd.; product name "S-4"; a volume-average particle diameter of 0.9 μm; a specific gravity of 2.40 g/cm$^3$.

B-2: aluminum hydroxide; manufactured by Showa Denko K.K.; product name "H-42"; a volume-average particle diameter of 1.0 μm; a specific gravity of 2.42 g/cm$^3$.

The following polytetrafluoroethylene resin (C) was used.

C-1: manufactured by DU PONT-MITSUI POLYCHEMICAL CO., LTD.; product name "31-JR"; a specific gravity of 2.10 g/cm$^3$.

Boron nitride (D) was produced and used as follows.

First, 60 kg of orthoboric acid, manufactured by NIPPON DENKO CO., LTD. (hereinafter, this product was used as orthoboric acid), 50 kg of melamine, manufactured by DSM, Ltd. (hereinafter, this product was used as melamine), and 1 kg of calcium carbonate as a Ca compound, manufactured by SHIRAISHI KOGYO, Ltd. (hereinafter, this product was used as calcium carbonate), were mixed by a Henschel mixer. Next, the mixture was placed in a constant temperature and humidity chamber at a temperature of 90° C. and a relative humidity of 85% for 5 hours to produce melamine borate. Then, the melamine borate was subjected to calcination and crystallization in a batch atmosphere furnace under a nitrogen atmosphere at 2000° C. for 2 hours to yield boron nitride with a graphitization index (GI) of 0.86 and a specific gravity of 2.27 g/cm$^3$. After that, grinding was adjusted to prepare D-1 with a volume-average particle diameter of 18.0 μm.

In a manner similar to D-1, calcination and crystallization were performed and grinding was adjusted to prepare D-2 with a volume-average particle diameter of 5.0 μm.

In a manner similar to D-1, calcination and crystallization were performed and grinding was adjusted to prepare D-3 with a volume-average particle diameter of 25.0 μm.

In a manner similar to D-1, calcination and crystallization were performed and grinding was adjusted to prepare D-4 with a volume-average particle diameter of 1.0 μm.

In a manner similar to D-1, calcination and crystallization were performed and grinding was adjusted to prepare D-5 with a volume-average particle diameter of 30.0 μm.

First, 70 kg of orthoboric acid, 50 kg of melamine, and 1 kg of calcium carbonate were mixed by a Henschel mixer. Next, the mixture was placed in a constant temperature and humidity chamber at a temperature of 80° C. and a relative humidity of 80% for 2 hours to produce melamine borate. Then, the melamine borate was subjected to calcination and crystallization in a batch atmosphere furnace under a nitrogen atmosphere at 1750° C. for 2 hours to yield boron nitride with a graphitization index (GI) of 3.95 and a specific gravity of 2.27 g/cm$^3$. After that, grinding was adjusted to prepare D-6 with a volume-average particle diameter of 18.0 μm.

First, 40 kg of anhydrous orthoboric acid, manufactured by Showa Chemical Industry Co., Ltd. (hereinafter, this product was used as anhydrous boric acid), 50 kg of melamine, and 1 kg of calcium borate, manufactured by KINSEI MATEC CO., LTD., were mixed by a Henschel mixer. Next, the mixture was placed in a constant temperature and humidity chamber at a temperature of 90° C. and a relative humidity of 85% for 5 hours to produce melamine borate. Then, the melamine borate was subjected to calcination and crystallization in a batch atmosphere furnace under a nitrogen atmosphere at 1900° C. for 2 hours to yield boron nitride with a graphitization index (GI) of 4.58 and a specific gravity of 2.27 g/cm$^3$. After that, grinding was adjusted to prepare D-7 with a volume-average particle diameter of 18.0 μm.

A volume-average particle diameter of boron nitride (D) was determined using a laser diffraction particle size distribution analyzer (LA-910) manufactured by HORIBA, LTD.

A graphitization index (GI) of boron nitride (D) was determined using a powder X-ray diffractometer (GF-2013) manufactured by Rigaku Corporation. Its X-ray diffraction diagram was used to determine an integrated intensity ratio, namely an area ratio, by using (100), (101), and (102) lines. The graphitization index (GI) was calculated using the following equation.

$$GI=[Area\{(100)+(101)\}]/[Area(102)].$$

The following inorganic oxide fillers (E) were used.

E-1: titanium oxide; manufactured by Du Pont Kabushiki Kaisha; product name "R-103"; a volume-average particle diameter of 0.2 μm; a specific gravity of 4.10 g/cm$^3$.

E-2: titanium oxide; manufactured by TAYCA, Ltd.; product name "JR-1000"; a volume-average particle diameter of 1.0 μm; a specific gravity of 4.20 g/cm$^3$.

E-3: spherical alumina; manufacture by DENKI KAGAKU KOGYO KABUSHIKI KAISHA; product name "ASFP-20"; a volume-average particle diameter of 0.3 μm; a specific gravity of 3.90 g/cm$^3$.

E-4: spherical alumina; manufacture by DENKI KAGAKU KOGYO KABUSHIKI KAISHA; product name "DAW-03"; a volume-average particle diameter of 3.0 μm; a specific gravity of 3.90 g/cm$^3$.

E-5: spherical alumina; manufacture by DENKI KAGAKU KOGYO KABUSHIKI KAISHA; product name "DAW-45"; a volume-average particle diameter of 45.0 μm; a specific gravity of 3.90 g/cm$^3$.

E-6: molten silica; manufacture by DENKI KAGAKU KOGYO KABUSHIKI KAISHA; product name "SFP-20M"; a volume-average particle diameter of 0.3 μm; a specific gravity of 2.20 g/cm$^3$.

E-7: molten silica; manufacture by DENKI KAGAKU KOGYO KABUSHIKI KAISHA; product name "FB-7SDC"; a volume-average particle diameter of 5.8 μm; a specific gravity of 2.20 g/cm$^3$.

E-8: zinc oxide; manufactured by SAKAI CHEMICAL INDUSTRY CO., LTD.; product name "1-shu" (First Grade); a volume-average particle diameter of 0.6 μm; a specific gravity of 5.60 g/cm$^3$.

E-9: magnesium oxide; manufactured by Konoshima Chemical Co., Ltd.; product name "STARMAG PSF-WR"; a volume-average particle diameter of 2.0 μm; a specific gravity of 3.60 g/cm$^3$.

The following metallic aluminum was used.

Alloy system: Al—Mg (5000 series); JIS nomenclature: 5052; a specific gravity of 2.70 g/cm$^3$.

Examples 1 to 32

In order to have combinations designated in Tables 1 to 3, a polyamide resin (A), a metal-hydroxide-based fire retardant (B), and a polytetrafluoroethylene resin (C) were placed in a Henschel mixer manufactured by MITSUI MIIKE MACHINERY CO., LTD. The mixture was mixed for 3 minutes at a low rotation speed. Next, a twin-screw extruder (TEM-35B), manufactured by TOSHIBA MACHINE CO., LTD., was used to perform melt kneading at a preset temperature of 260° C. and a screw rotation speed of 200 rpm to prepare a pellet of a thermoplastic resin composition (X). In order to have combinations designated in Tables 1 to 3, boron nitride (D) or a mixture of an inorganic filler (Y) comprising boron nitride (D) and an inorganic filler (E) per 100 parts by mass of the pellet of the resulting thermoplastic resin composition (X) was combined. A twin-screw extruder (Model HTM-38), manufactured by CTE. Ltd., was used to perform melt kneading at a preset temperature of 260° C. and a screw rotation speed of 300 rpm to prepare a pellet of a heat-dissipating resin composition. This pellet and an injection molder were used to produce a test piece and an LED light housing for evaluation. Then, various evaluations were carried out. Tables 1 to 3 show the results.

Comparative Example 1

Metallic aluminum was subjected to press molding to prepare a test piece and an LED light housing for evaluation. Then, various evaluations were carried out. Table 4 shows the results. Note that the term ">100" in Table 4 means that an LED was damaged due to heat at a temperature of 100° C. or higher.

Comparative Example 2

A pellet of a polyamide resin (A) and an injection moulder were used to prepare a test piece and an LED light housing for evaluation. Then, various evaluations were carried out. Table 4 shows the results.

Comparative Examples 3 to 11

In order to have combinations designated in Table 4, a polyamide resin (A), a metal-hydroxide-based fire retardant (B), and a polytetrafluoroethylene resin (C) were placed in a Henschel mixer manufactured by MITSUI MIIKE MACHINERY CO., LTD. The mixture was mixed for 3 minutes at a low rotation speed. Next, a twin-screw extruder (TEM-35B), manufactured by TOSHIBA MACHINE CO., LTD., was used to perform melt kneading at a preset temperature of 260° C. and a screw rotation speed of 200 rpm to prepare a pellet of a thermoplastic resin composition (X). In order to have combinations designated in Table 4, boron nitride (D) or a mixture of an inorganic filler (Y) comprising boron nitride (D) and an inorganic filler (E) per 100 parts by mass of the pellet of the resulting thermoplastic resin composition (X) was combined. A twin-screw extruder (Model HTM-38), manufactured by CTE. Ltd., was used to perform melt kneading at a preset temperature of 260° C. and a screw rotation speed of 300 rpm to prepare a pellet of a heat-dissipating resin composition. This pellet and an injection molder were used to produce a test piece and an LED light housing for evaluation. Then, various evaluations were carried out. Table 4 shows the results.

Comparative Example 12

In Comparative Example 12, a test piece for evaluation was prepared and various evaluations were carried out in the same procedure as in Example 1 except using a PET resin ("NOVA-DURAN 5505S" manufactured by Mitsubishi Engineering- Plastics Corporation) as an alternative for the polyamide resin (A). Table 5 shows the results.

Comparative Example 13

In Comparative Example 13, a test piece for evaluation was prepared and various evaluations were carried out in the same procedure as in Example 1 except using a polycarbonate resin ("NOVAREX 7022PJ-LH1" manufactured by Mitsubishi Engineering-Plastics Corporation) as an alternative for the polyamide resin (A). Table 5 shows the results.

Comparative Example 14

In Comparative Example 14, a test piece for evaluation was prepared and various evaluations were carried out in the same procedure as in Example 1 except using a phosphorus-based fire retardant (triphenyl phosphate) as an alternative for the metal-hydroxide-based fire retardant (B). Table 5 shows the results.

Comparative Example 15

In Comparative Example 15, a test piece for evaluation was prepared and various evaluations were carried out in the same procedure as in Example 1 except using an acryl-silicon composite rubber as an anti-drip agent instead of using the polytetrafluoroethylene resin (C). Table 5 shows the results.

Note that the acryl-silicon composite rubber was a graft copolymer comprising 100 parts of polyorganosiloxane latex, 37.5 parts of n-butyl acrylate, 2.5 parts of allyl methacrylate, and 30 parts of methyl methacrylate (the graft copolymer was prepared by graft polymerization using methyl methacrylate as an alternative for acrylonitrile and styrene according to a process disclosed in Examples and Reference Example 1 of JP-S64-79257A).

TABLE 1

| | | | | Volume-average particle diameter [μm] | GI [—] | Specific gravity [g/cm$^3$] | | Examples | | | | | |
|---|---|---|---|---|---|---|---|---|---|---|---|---|---|
| | | | | | | | | 1 | 2 | 3 | 4 | 5 | 6 |
| Thermoplastic resin composition (X) | Polyamide resin (A) | A-1 | Nylon 6 | — | — | 1.14 | Parts by mass | 55 | | | 55 | 55 | 55 |
| | | A-2 | Nylon 6,6 | — | — | 1.14 | Parts by mass | | 55 | | | | |
| | | A-3 | Nylon 12 | — | — | 1.01 | Parts by mass | | | 55 | | | |
| | Metal-hydroxide-based fire retardant (B) | B-1 | Magnesium hydroxide | 0.9 | — | 2.40 | Parts by mass | 44.5 | 44.5 | 44.5 | | 44.5 | 44.5 |
| | | B-2 | Aluminum hydroxide | 1.0 | — | 2.42 | Parts by mass | | | | 44.5 | | |
| | Polytetrafluoroethylene resin (C) | C-1 | — | — | — | 2.10 | Parts by mass | 0.5 | 0.5 | 0.5 | 0.5 | 0.5 | 0.5 |
| Inorganic filler (Y) | Boron nitride (D) | D-1 | — | 18.0 | 0.86 | 2.27 | Parts by mass | 30 | 30 | 30 | 30 | | |
| | | D-2 | — | 5.0 | 0.86 | 2.27 | Parts by mass | | | | | 30 | |
| | | D-3 | — | 25.0 | 0.86 | 2.27 | Parts by mass | | | | | | 30 |
| | | D-4 | — | 1.0 | 0.86 | 2.27 | Parts by mass | | | | | | |
| | | D-5 | — | 30.0 | 0.86 | 2.27 | Parts by mass | | | | | | |
| | | D-6 | — | 18.0 | 3.95 | 2.27 | Parts by mass | | | | | | |
| | | D-7 | — | 18.0 | 4.58 | 2.27 | Parts by mass | | | | | | |
| | | | | | | | Total•Parts by mass | 130 | 130 | 130 | 130 | 130 | 130 |
| Heat-dissipating resin composition | Thermal conductivity [W/m·K] | | | | | | | 3.1 | 3.0 | 2.8 | 3.0 | 2.0 | 3.2 |
| | Thermal emittance [—] | | | | | | | 0.85 | 0.84 | 0.84 | 0.85 | 0.85 | 0.84 |
| | Fire retardancy UL-94 standard | | | | | | | V-0 | V-0 | V-0 | V-0 | V-0 | V-0 |
| | Specific gravity [g/cm$^3$] | | | | | | | 1.61 | 1.61 | 1.50 | 1.62 | 1.61 | 1.61 |
| | Lightness (L*)[—] | | | | | | | 92 | 89 | 91 | 82 | 91 | 89 |
| | Volume-specific resistance [Ω·m] | | | | | | | 8.0 × 10$^{14}$ | 7.9 × 10$^{14}$ | 7.8 × 10$^{14}$ | 8.1 × 10$^{14}$ | 8.1 × 10$^{14}$ | 7.9 × 10$^{14}$ |
| | Molding processability | | | | | | | B | B | B | C | B | B |
| LED light housing | Heat dissipation evaluation | Temperature of heat-generating portion of LED member [° C.] | | | | | After 10 min | 57 | 58 | 60 | 58 | 67 | 57 |
| | | | | | | | After 30 min | 62 | 62 | 64 | 62 | 71 | 62 |
| | | | | | | | After 1 hr | 69 | 69 | 72 | 69 | 78 | 69 |
| | | | | | | | After 24 hr | 69 | 69 | 72 | 69 | 78 | 69 |
| | | | | | | | After 1000 hr | 69 | 69 | 72 | 69 | 78 | 69 |
| | | Temperature of housing member [° C.] | | | | | After 10 min | 45 | 45 | 45 | 45 | 44 | 45 |
| | | | | | | | After 30 min | 50 | 51 | 51 | 51 | 50 | 50 |
| | | | | | | | After 1 hr | 56 | 57 | 57 | 57 | 57 | 56 |
| | | | | | | | After 24 hr | 56 | 57 | 57 | 57 | 57 | 56 |
| | | | | | | | After 1000 hr | 56 | 57 | 57 | 57 | 57 | 56 |

| | Volume-average particle diameter [μm] | GI [—] | Specific gravity [g/cm$^3$] | Examples | | | |
|---|---|---|---|---|---|---|---|
| | | | | 7 | 8 | 9 | 10 |

TABLE 1-continued

| | | | | Volume-average particle diameter [μm] | GI [—] | Specific gravity [g/cm³] | | | | | |
|---|---|---|---|---|---|---|---|---|---|---|---|
| Thermoplastic resin composition (X) | Polyamide resin (A) | A-1 | Nylon 6 | — | — | 1.14 | Parts by mass | 55 | 55 | 55 | 55 |
| | | A-2 | Nylon 6,6 | — | — | 1.14 | Parts by mass | | | | |
| | | A-3 | Nylon 12 | — | — | 1.01 | Parts by mass | | | | |
| | Metal-hydroxide-based fire retardant (B) | B-1 | Magnesium hydroxide | 0.9 | — | 2.40 | Parts by mass | 44.5 | 44.5 | 44.5 | 44.5 |
| | | B-2 | Aluminum hydroxide | 1.0 | — | 2.42 | Parts by mass | | | | |
| | Polytetrafluoroethylene resin (C) | C-1 | — | — | — | 2.10 | Parts by mass | 0.5 | 0.5 | 0.5 | 0.5 |
| Inorganic filler (Y) | Boron nitride (D) | D-1 | — | 18.0 | 0.86 | 2.27 | Parts by mass | | | | |
| | | D-2 | — | 5.0 | 0.86 | 2.27 | Parts by mass | | | | |
| | | D-3 | — | 25.0 | 0.86 | 2.27 | Parts by mass | | | | |
| | | D-4 | — | 1.0 | 0.86 | 2.27 | Parts by mass | 30 | | | |
| | | D-5 | — | 30.0 | 0.86 | 2.27 | Parts by mass | | 30 | | |
| | | D-6 | — | 18.0 | 3.95 | 2.27 | Parts by mass | | | 30 | |
| | | D-7 | — | 18.0 | 4.58 | 2.27 | Parts by mass | | | | 30 |
| | | | | | | | Total·Parts by mass | 130 | 130 | 130 | 130 |
| Heat-dissipating resin composition | Thermal conductivity [W/m·K] | | | | | | | 1.5 | 3.3 | 2.7 | 2.3 |
| | Thermal emittance [—] | | | | | | | 0.85 | 0.84 | 0.85 | 0.85 |
| | Fire retardancy UL-94 standard | | | | | | | V-0 | V-0 | V-0 | V-0 |
| | Specific gravity [g/cm³] | | | | | | | 1.61 | 1.61 | 1.61 | 1.61 |
| | Lightness (L*)[—] | | | | | | | 91 | 88 | 92 | 92 |
| | Volume-specific resistance [Ω·m] | | | | | | | $8.2 \times 10^{14}$ | $7.8 \times 10^{14}$ | $7.8 \times 10^{14}$ | $7.8 \times 10^{14}$ |
| | Molding processability | | | | | | | B | C | B | B |
| LED light housing | Heat dissipation evaluation | Temperature of heat-generating portion of LED member [°C] | | | | | After 10 min | 71 | 56 | 61 | 64 |
| | | | | | | | After 30 min | 75 | 61 | 65 | 68 |
| | | | | | | | After 1 hr | 82 | 68 | 73 | 75 |
| | | | | | | | After 24 hr | 83 | 63 | 73 | 75 |
| | | | | | | | After 1000 hr | 83 | 68 | 73 | 75 |
| | | Temperature of housing member [°C] | | | | | After 10 min | 42 | 44 | 45 | 42 |
| | | | | | | | After 30 min | 49 | 49 | 51 | 49 |
| | | | | | | | After 1 hr | 54 | 56 | 57 | 54 |
| | | | | | | | After 24 hr | 54 | 56 | 57 | 54 |
| | | | | | | | After 1000 hr | 54 | 56 | 57 | 54 |

TABLE 2

| | | | | Volume-average particle diameter [μm] | GI [—] | Specific gravity [g/cm³] | | Examples | | | | |
|---|---|---|---|---|---|---|---|---|---|---|---|---|
| | | | | | | | | 11 | 12 | 13 | 14 | 15 |
| Thermoplastic resin composition (X) | Polyamide resin (A) | A-1 | Nylon 6 | — | — | 1.14 | Parts by mass | 55 | 55 | 55 | 55 | 40 |
| | Metal-hydroxide-based fire retardant (B) | B-1 | Magnesium hydroxide | 0.9 | — | 2.40 | Parts by mass | 44.5 | 44.5 | 44.5 | 44.5 | 59.8 |
| | Polytetrafluoroethylene resin (C) | C-1 | | — | — | 2.10 | Parts by mass | 0.5 | 0.5 | 0.5 | 0.5 | 0.2 |
| Inorganic filler (Y) | Boron nitride (D) | D-1 | | 18.0 | 0.86 | 2.27 | Parts by mass | 5 | 15 | 45 | 60 | 30 |
| | | | | | | | Total·Parts by mass | 105 | 115 | 145 | 160 | 130 |
| Heat-dissipating resin composition | Thermal conductivity [W/m·K] | | | | | | | 1.1 | 2.0 | 3.5 | 3.8 | 3.3 |
| | Thermal emittance [—] | | | | | | | 0.85 | 0.85 | 0.85 | 0.85 | 0.85 |
| | Fire retardancy UL-94 standard | | | | | | | V-0 | V-0 | V-0 | V-0 | V-0 |
| | Specific gravity [g/cm³] | | | | | | | 1.51 | 1.56 | 1.66 | 1.71 | 1.77 |
| | Lightness (L*)[—] | | | | | | | 88 | 90 | 91 | 90 | 85 |
| | Volume-specific resistance [Ω·m] | | | | | | | $7.9 \times 10^{14}$ | $7.9 \times 10^{14}$ | $7.8 \times 10^{14}$ | $8.0 \times 10^{14}$ | $8.1 \times 10^{14}$ |
| | Molding processability | | | | | | | B | B | B | C | C |

TABLE 2-continued

| | | | | | | | | |
|---|---|---|---|---|---|---|---|---|
| LED light housing | Heat dissipation evaluation | Temperature of heat-generating portion of LED member [° C.] | | After 10 min | 76 | 67 | 55 | 54 | 56 |
| | | | | After 30 min | 81 | 71 | 60 | 59 | 61 |
| | | | | After 1 hr | 88 | 78 | 67 | 66 | 68 |
| | | | | After 24 hr | 88 | 78 | 67 | 66 | 68 |
| | | | | After 1000 hr | 88 | 78 | 67 | 66 | 68 |
| | | Temperature of housing member [° C.] | | After 10 min | 41 | 44 | 45 | 46 | 44 |
| | | | | After 30 min | 48 | 50 | 50 | 51 | 49 |
| | | | | After 1 hr | 53 | 57 | 57 | 58 | 56 |
| | | | | After 24 hr | 53 | 57 | 57 | 58 | 56 |
| | | | | After 1000 hr | 53 | 57 | 57 | 58 | 56 |

| | | | | | Volume-average particle diameter [μm] | GI [—] | Specific gravity [g/cm³] | | Examples | | | |
|---|---|---|---|---|---|---|---|---|---|---|---|---|
| | | | | | | | | | 16 | 17 | 18 | 19 |
| Thermoplastic resin composition (X) | Polyamide resin (A) | A-1 | Nylon 6 | | — | — | 1.14 | Parts by mass | 45 | 60 | 64 | 65 |
| | Metal-hydroxide-based fire retardant (B) | B-1 | Magnesium hydroxide | | 0.9 | — | 2.40 | Parts by mass | 54.6 | 39.5 | 35.3 | 33.5 |
| | Polytetra-fluoro-ethylene resin (C) | C-1 | | | — | — | 2.10 | Parts by mass | 0.4 | 0.5 | 0.7 | 1.5 |
| Inorganic filler (Y) | Boron nitride (D) | D-1 | | | 18.0 | 0.86 | 2.27 | Parts by mass | 30 | 30 | 30 | 30 |
| | | | | | | | | Total•Parts by mass | 130 | 130 | 130 | 130 |
| Heat-dissipating resin composition | Thermal conductivity [W/m · K] | | | | | | | | 3.2 | 2.9 | 2.8 | 2.8 |
| | Thermal emittance [—] | | | | | | | | 0.84 | 0.84 | 0.84 | 0.84 |
| | Fire retardancy UL-94 standard | | | | | | | | V-0 | V-0 | V-1 | V-0 |
| | Specific gravity [g/cm³] | | | | | | | | 1.71 | 1.57 | 1.53 | 1.51 |
| | Lightness (L*)[—] | | | | | | | | 89 | 92 | 92 | 89 |
| | Volume-specific resistance [Ω · m] | | | | | | | | 7.8 × 10¹⁴ | 7.9 × 10¹⁴ | 8.1 × 10¹⁴ | 8.2 × 10¹⁴ |
| | Molding processability | | | | | | | | B | B | B | C |
| LED light housing | Heat dissipation evaluation | Temperature of heat-generating portion of LED member [° C.] | | After 10 min | | | | | 57 | 59 | 60 | 60 |
| | | | | After 30 min | | | | | 62 | 63 | 64 | 64 |
| | | | | After 1 hr | | | | | 69 | 71 | 72 | 72 |
| | | | | After 24 hr | | | | | 69 | 71 | 72 | 72 |
| | | | | After 1000 hr | | | | | 69 | 71 | 72 | 72 |
| | | Temperature of housing member [° C.] | | After 10 min | | | | | 45 | 45 | 45 | 45 |
| | | | | After 30 min | | | | | 50 | 51 | 51 | 51 |
| | | | | After 1 hr | | | | | 56 | 57 | 57 | 57 |
| | | | | After 24 hr | | | | | 56 | 57 | 57 | 57 |
| | | | | After 1000 hr | | | | | 56 | 57 | 57 | 57 |

TABLE 3

| | | | | Volume-average particle diameter [μm] | GI [—] | Specific gravity [g/cm³] | | Examples | | | | | | |
|---|---|---|---|---|---|---|---|---|---|---|---|---|---|---|
| | | | | | | | | 20 | 21 | 22 | 23 | 24 | 25 | 26 |
| Thermoplastic resin composition (X) | Polyamide resin (A) | A-1 | Nylon 6 | — | — | 1.14 | Parts by mass | 55 | 55 | 55 | 55 | 55 | 55 | 60 |
| | Metal-hydroxide-based fire retardant (B) | B-1 | Magnesium hydroxide | 0.9 | — | 2.40 | Parts by mass | 44.5 | 44.5 | 44.5 | 44.5 | 44.5 | 44.5 | 39.5 |
| | Polytetra-fluoro-ethylene resin (C) | C-1 | — | — | — | 2.10 | Parts by mass | 0.5 | 0.5 | 0.5 | 0.5 | 0.5 | 0.5 | 0.5 |
| Inorganic | Boron | D-1 | — | 18.0 | 0.86 | 2.27 | Parts by mass | 27 | 24 | 15 | 5 | 30 | 20 | 10 |

TABLE 3-continued

| | | | | Volume-average particle diameter [μm] | GI [—] | Specific gravity [g/cm³] | | | | | | | | | |
|---|---|---|---|---|---|---|---|---|---|---|---|---|---|---|---|
| filler (Y) | nitride (D) | | | | | | | | | | | | | | |
| | Inorganic oxide filter (E) | E-1 | Titanium oxide | 0.2 | — | 4.10 | Parts by mass | 3 | 12 | 30 | 45 | 30 | 80 | 190 |
| | | E-2 | | 1.0 | — | 4.20 | Parts by mass | | | | | | | |
| | | E-3 | Spherical alumina | 0.3 | — | 3.90 | Parts by mass | | | | | | | |
| | | E-4 | | 3.0 | — | 3.90 | Parts by mass | | | | | | | |
| | | E-6 | Molten silica | 0.3 | — | 2.20 | Parts by mass | | | | | | | |
| | | E-8 | Zinc oxide | 0.6 | — | 5.60 | Parts by mass | | | | | | | |
| | | E-9 | Magnesium oxide | 2.0 | — | 3.60 | Parts by mass | | | | | | | |
| | | | | | | | Total·Parts by mass | 130 | 136 | 145 | 150 | 160 | 200 | 300 |
| Boron nitride (D) % by mass (meaning boron nitride (D) in inorganic filler (Y)) | | | | | | | | 90% | 67% | 33% | 10% | 50% | 20% | 5% |
| Inorganic oxide filter (E) % by mass (meaning inorganic oxide filter (E) in inorganic filler (Y)) | | | | | | | | 10% | 33% | 67% | 90% | 50% | 80% | 95% |
| Heat-dissipating resin composition | Thermal conductivity [W/m·K] | | | | | | | 2.8 | 2.5 | 2.1 | 1.8 | 3.3 | 2.4 | 3.0 |
| | Thermal emittance [—] | | | | | | | 0.85 | 0.84 | 0.84 | 0.85 | 0.85 | 0.84 | 0.80 |
| | Fire retardancy UL-94 standard | | | | | | | V-0 | V-0 | V-0 | V-0 | V-0 | V-0 | V-1 |
| | Specific gravity [g/cm³] | | | | | | | 1.63 | 1.73 | 1.79 | 1.86 | 1.82 | 2.09 | 2.49 |
| | Lightness (L*)[—] | | | | | | | 97 | 98 | 98 | 98 | 98 | 98 | 98 |
| | Volume-specific resistance [Ω·m] | | | | | | | 8.0 × $10^{14}$ | 7.9 × $10^{14}$ | 7.8 × $10^{14}$ | 8.0 × $10^{14}$ | 8.1 × $10^{14}$ | 7.9 × $10^{14}$ | 7.8 × $10^{14}$ |
| | Molding processability | | | | | | | A | A | A | B | A | A | C |
| LED light housing evaluation | Heat dissipation | Temperature of heat-generating portion of LED member [°C.] | | | | | After 10 min | 60 | 63 | 66 | 69 | 56 | 64 | 58 |
| | | | | | | | After 30 min | 64 | 67 | 70 | 73 | 61 | 67 | 62 |
| | | | | | | | After 1 hr | 72 | 74 | 77 | 80 | 68 | 74 | 69 |
| | | | | | | | After 24 hr | 72 | 74 | 77 | 80 | 68 | 74 | 69 |
| | | | | | | | After 1000 hr | 72 | 74 | 77 | 80 | 68 | 74 | 69 |
| | | Temperature of housing member [°C.] | | | | | After 10 min | 45 | 43 | 43 | 44 | 44 | 43 | 45 |
| | | | | | | | After 30 min | 51 | 50 | 49 | 50 | 49 | 50 | 51 |
| | | | | | | | After 1 hr | 57 | 55 | 56 | 57 | 56 | 55 | 57 |
| | | | | | | | After 24 hr | 57 | 55 | 56 | 57 | 56 | 55 | 57 |
| | | | | | | | After 1000 hr | 57 | 55 | 56 | 57 | 56 | 55 | 57 |

| | | | | Volume-average particle diameter [μm] | GI [—] | Specific gravity [g/cm³] | | Examples | | | | | |
|---|---|---|---|---|---|---|---|---|---|---|---|---|---|
| | | | | | | | | 27 | 28 | 29 | 30 | 31 | 32 |
| Thermoplastic resin composition (X) | Polyamide resin (A) | A-1 | Nylon 6 | — | — | 1.14 | Parts by mass | 55 | 55 | 55 | 55 | 55 | 55 |
| | Metal-hydroxide-based fire retardant (B) | B-1 | Magnesium hydroxide | 0.9 | — | 2.40 | Parts by mass | 44.5 | 44.5 | 44.5 | 44.5 | 44.5 | 44.5 |
| | Polytetrafluoroethylene resin (C) | C-1 | — | — | — | 2.10 | Parts by mass | 0.5 | 0.5 | 0.5 | 0.5 | 0.5 | 0.5 |
| Inorganic filler (Y) | Boron nitride (D) | D-1 | — | 18.0 | 0.86 | 2.27 | Parts by mass | 30 | 30 | 30 | 30 | 30 | 30 |
| | Inorganic oxide filter (E) | E-1 | Titanium oxide | 0.2 | — | 4.10 | Parts by mass | 30 | | | | | |
| | | E-2 | | 1.0 | — | 4.20 | Parts by mass | | 30 | | | | |
| | | E-3 | Spherical alumina | 0.3 | — | 3.90 | Parts by mass | | | 30 | | | |
| | | E-4 | | 3.0 | — | 3.90 | Parts by mass | | | | 30 | | |
| | | E-6 | Molten silica | 0.3 | — | 2.20 | Parts by mass | | | | | 30 | |
| | | E-8 | Zinc oxide | 0.6 | — | 5.60 | Parts by mass | | | | | | 30 |
| | | E-9 | Magnesium oxide | 2.0 | — | 3.60 | Parts by mass | | | | | | 30 |
| | | | | | | | Total·Parts by mass | 160 | 160 | 160 | 160 | 160 | 160 |
| Boron nitride (D) % by mass (meaning boron nitride (D) in inorganic filler (Y)) | | | | | | | | 50% | 50% | 50% | 50% | 50% | 50% |
| Inorganic oxide filter (E) % by mass (meaning inorganic oxide filter (E) in inorganic filler (Y)) | | | | | | | | 50% | 50% | 50% | 50% | 50% | 50% |
| Heat- | Thermal conductivity [W/m·K] | | | | | | | 3.4 | 3.4 | 3.5 | 3.1 | 3.5 | 3.5 |

TABLE 3-continued

| | | | | | | | | | |
|---|---|---|---|---|---|---|---|---|---|
| dissipating resin composition | Thermal emittance [—] | | | 0.84 | 0.84 | 0.84 | 0.85 | 0.84 | 0.85 |
| | Fire retardancy UL-94 standard | | | V-0 | V-0 | V-0 | V-0 | V-0 | V-0 |
| | Specific gravity [g/cm$^3$] | | | 1.83 | 1.81 | 1.81 | 1.70 | 1.86 | 1.80 |
| | Lightness (L*)[—] | | | 98 | 90 | 86 | 90 | 94 | 91 |
| | Volume-specific resistance [Ω·m] | | | 7.9 × 10$^{14}$ | 7.1 × 10$^{14}$ | 6.8 × 10$^{14}$ | 7.8 × 10$^{14}$ | 3.2 × 10$^{14}$ | 8.2 × 10$^{14}$ |
| | Molding processability | | | B | B | B | B | B | C |
| LED light housing | Heat dissipation evaluation | Temperature of heat-generating portion of LED member [° C.] | After 10 min | 56 | 56 | 55 | 57 | 55 | 55 |
| | | | After 30 min | 61 | 61 | 60 | 62 | 60 | 60 |
| | | | After 1 hr | 68 | 68 | 67 | 69 | 67 | 67 |
| | | | After 24 hr | 68 | 68 | 67 | 69 | 67 | 67 |
| | | | After 1000 hr | 68 | 68 | 67 | 69 | 67 | 67 |
| | | Temperature of housing member [° C.] | After 10 min | 44 | 44 | 45 | 45 | 45 | 45 |
| | | | After 30 min | 49 | 49 | 50 | 50 | 50 | 50 |
| | | | After 1 hr | 56 | 56 | 57 | 56 | 57 | 57 |
| | | | After 24 hr | 56 | 56 | 57 | 56 | 57 | 57 |
| | | | After 1000 hr | 56 | 56 | 57 | 56 | 57 | 57 |

TABLE 4

| | | | | Volume-average particle diameter [μm] | GI [—] | Specific gravity [g/cm$^3$] | | Comparative Examples | | | | | |
|---|---|---|---|---|---|---|---|---|---|---|---|---|---|
| | | | | | | | | 1 | 2 | 3 | 4 | 5 | 6 |
| Thermoplastic resin composition (X) | Polyamide resin (A) | A-1 | Nylon 6 | — | — | 1.14 | Parts by mass | | 100 | 55 | 60 | 30 | 80 |
| | Metal-hydroxide-based fire retardant (B) | B-1 | Magnesium hydroxide | 0.9 | — | 2.40 | Parts by mass | | | 44.5 | 39.5 | 69.5 | 19.5 |
| | Polytetrafluoroethylene resin (C) | C-1 | — | — | — | 2.10 | Parts by mass | | | 0.5 | 0.5 | 0.5 | 0.5 |
| Inorganic filler (Y) | Boron nitride (D) | D-1 | — | 18.0 | 0.86 | 2.27 | Parts by mass | | | | 15 | 30 | 30 |
| | Inorganic oxide filler (E) | E-1 | Titanium oxide | 0.2 | — | 4.10 | Parts by mass | | | | 235 | | |
| | | E-5 | Spherical alumina | 45.0 | — | 3.90 | Parts by mass | | | | | | |
| | | E-7 | Molten silica | 5.8 | — | 2.20 | Parts by mass | | | | | | |
| Metallic aluminum | | | | | | 2.70 | Parts by mass | 100 | | | | | |
| | | | | | | | Total·Parts by mass | 100 | 100 | 100 | 350 | 130 | 130 |
| Boron nitride (D) % by mass (meaning boron nitride (D) in Inorganic filler (Y)) | | | | | | | | — | — | — | 6% | 100% | 100% |
| Inorganic oxide filler (E) % by mass (meaning inorganic oxide filler (E) in inorganic filler (Y)) | | | | | | | | — | — | — | 94% | 0% | 0% |
| Heat-dissipating resin composition | Thermal conductivity [W/m·K] | | | | | | | 138.0 | 0.2 | 0.4 | 3.1 | 3.4 | 0.8 |
| | Thermal emittance [—] | | | | | | | 0.05 | 0.85 | 0.84 | 0.78 | 0.79 | 0.84 |
| | Fire retardancy UL-94 standard | | | | | | | — | V-2 | V-0 | V-1 | V-0 | NG |
| | Specific gravity [g/cm$^3$] | | | | | | | 2.70 | 1.14 | 1.48 | 2.62 | 1.88 | 1.41 |
| | Lightness (L*)[—] | | | | | | | 41 | 75 | 65 | 97 | 80 | 90 |
| | Volume-specific resistance [Ω·m] | | | | | | | 2.7 × 10$^{-7}$ | 1.0 × 10$^{16}$ | 9.8 × 10$^{14}$ | 8.0 × 10$^{14}$ | 8.1 × 10$^{14}$ | 7.8 × 10$^{14}$ |
| | Molding processability | | | | | | | — | C | C | D | D | B |
| LED light housing | Heat dissipation evaluation | Temperature of heat-generating portion of LED member [° C.] | After 10 min | | | | | 85 | 95 | 91 | 57 | 56 | 80 |
| | | | After 30 min | | | | | 88 | 99 | 95 | 62 | 61 | 85 |
| | | | After 1 hr | | | | | 90 | ※ > 100 | 95 | 69 | 68 | 92 |
| | | | After 24 hr | | | | | 90 | 23 | ※ > 100 | 69 | 68 | 97 |
| | | | After 1000 hr | | | | | 90 | 23 | 23 | 69 | 68 | ※ > 100 |
| | | Temperature of housing member [° C.] | After 10 min | | | | | 75 | 30 | 35 | 45 | 44 | 40 |
| | | | After 30 min | | | | | 79 | 31 | 36 | 50 | 49 | 48 |
| | | | After 1 hr | | | | | 81 | 25 | 40 | 56 | 56 | 52 |
| | | | After 24 hr | | | | | 81 | 23 | 23 | 56 | 56 | 52 |
| | | | After 1000 hr | | | | | 81 | 23 | 23 | 56 | 56 | 23 |

TABLE 4-continued

| | | | | Volume-average particle diameter [μm] | GI [—] | Specific gravity [g/cm³] | | Comparative Examples | | | | |
|---|---|---|---|---|---|---|---|---|---|---|---|---|
| | | | | | | | | 7 | 8 | 9 | 10 | 11 |
| Thermoplastic resin composition (X) | Polyamide resin (A) | A-1 | Nylon 6 | — | — | 1.14 | Parts by mass | 55 | 55 | 55 | 55 | 55 |
| | Metal-hydroxide-based fire retardant (B) | B-1 | Magnesium hydroxide | 0.9 | — | 2.40 | Parts by mass | 45 | 43 | 44.5 | 44.5 | 44.5 |
| | Polytetrafluoroethylene resin (C) | C-1 | — | — | — | 2.10 | Parts by mass | 0 | 2 | 0.5 | 0.5 | 0.5 |
| Inorganic filler (Y) | Boron nitride (D) | D-1 | — | 18.0 | 0.86 | 2.27 | Parts by mass | 30 | 30 | | | |
| | Inorganic oxide filler (E) | E-1 | Titanium oxide | 0.2 | — | 4.10 | Parts by mass | | | 30 | | |
| | | E-5 | Spherical alumina | 45.0 | — | 3.90 | Parts by mass | | | | 30 | |
| | | E-7 | Molten silica | 5.8 | — | 2.20 | Parts by mass | | | | | 30 |
| Metallic aluminum | | | | | | 2.70 | Parts by mass | | | | | |
| | | | | | | | Total•Parts by mass | 130 | 130 | 130 | 130 | 130 |
| Boron nitride (D) % by mass (meaning boron nitride (D) in Inorganic filler (Y)) | | | | | | | | 100% | 100% | 0% | 0% | 0% |
| Inorganic oxide filler (E) % by mass (meaning inorganic oxide filler (E) in inorganic filler (Y)) | | | | | | | | 0% | 0% | 100% | 100% | 100% |
| Heat-dissipating resin composition | Thermal conductivity [W/m · K] | | | | | | | 3.1 | 3.1 | 0.6 | 0.5 | 0.4 |
| | Thermal emittance [—] | | | | | | | 0.85 | 0.85 | 0.84 | 0.85 | 0.85 |
| | Fire retardancy UL-94 standard | | | | | | | V-2 | V-0 | V-0 | V-0 | V-0 |
| | Specific gravity [g/cm³] | | | | | | | 1.62 | 1.59 | 1.74 | 1.73 | 1.61 |
| | Lightness (L*)[—] | | | | | | | 92 | 89 | 97 | 63 | 90 |
| | Volume-specific resistance [Ω · m] | | | | | | | $7.9 \times 10^{14}$ | $7.1 \times 10^{14}$ | $7.1 \times 10^{14}$ | $6.8 \times 10^{14}$ | $7.8 \times 10^{14}$ |
| | Molding processability | | | | | | | B | D | A | B | B |
| LED light housing | Heat dissipation evaluation | Temperature of heat-generating portion of LED member [° C.] | | | | | After 10 min | 57 | 57 | 86 | 88 | 91 |
| | | | | | | | After 30 min | 62 | 62 | 90 | 92 | 95 |
| | | | | | | | After 1 hr | 69 | 69 | 97 | 95 | 95 |
| | | | | | | | After 24 hr | 69 | 69 | 99 | ✗ > 100 | ✗ > 100 |
| | | | | | | | After 1000 hr | 69 | 69 | ✗ > 100 | 23 | 23 |
| | | Temperature of housing member [° C.] | | | | | After 10 min | 45 | 45 | 37 | 36 | 35 |
| | | | | | | | After 30 min | 50 | 50 | 38 | 37 | 36 |
| | | | | | | | After 1 hr | 56 | 56 | 42 | 41 | 40 |
| | | | | | | | After 24 hr | 56 | 56 | 45 | 23 | 23 |
| | | | | | | | After 1000 hr | 56 | 56 | 23 | 23 | 23 |

TABLE 5

| | | | | | | | | | dfdfd | | | |
|---|---|---|---|---|---|---|---|---|---|---|---|---|
| | | | | | Volume-average particle diameter [μm] | GI [—] | Specific gravity [g/cm³] | | | Comparative Examples | | |
| | | | | | | | | | 12 | 13 | 14 | 15 |
| Thermoplastic resin composition (X) | Polyamide resin (A) | A-1 | Nylon 6 | | — | — | 1.14 | Parts by mass | | | 55 | 55 |
| | PET resin | | | | — | — | | Parts by mass | 55 | | | |
| | Polycarbonate resin | | | | — | — | | Parts by mass | | 55 | | |
| | Metal-hydroxide-based fire retardant (B) | B-1 | Magnesium hydroxide | | 0.9 | — | 2.40 | Parts by mass | 44.5 | 44.5 | | 44.5 |
| | Phosphorus-based fire | | Triphenyl | | | | | | | | 44.5 | |

TABLE 5-continued dfdfd

| | | | | Volume-average particle diameter [μm] | GI [—] | Specific gravity [g/cm³] | | Comparative Examples | | | |
|---|---|---|---|---|---|---|---|---|---|---|---|
| | | | | | | | | 12 | 13 | 14 | 15 |
| | retardant | | phosphate | | | | | | | | |
| | Polytetrafluoroethylene resin (C) | C-1 | — | — | — | 2.10 | Parts by mass | 0.5 | 0.5 | 0.5 | |
| | Acryl-silicon composite rubber | | | | | | | | | | 0.5 |
| Inorganic filler (Y) | Boron nitride (D) | D-1 | — | 18.0 | 0.86 | 2.27 | Parts by mass | 30 | 30 | 30 | 30 |
| | | | | | | | Total•Parts by mass | 130 | 130 | 130 | 130 |
| Heat-dissipating resin composition | Thermal conductivity [W/m · K] | | | | | | | 3.1 | 3.1 | 2.5 | 3.1 |
| | Thermal emittance [—] | | | | | | | — | — | — | — |
| | Fire retardancy UL-94 standard | | | | | | | V-1 | V-1 | V-1 | V-1 |
| | Specific gravity [g/cm³] | | | | | | | — | — | — | — |
| | Lightness (L*)[—] | | | | | | | — | — | — | — |
| | Volume-specific resistance [Ω · m] | | | | | | | — | — | — | — |
| | Molding processability | | | | | | | D | D | D | D |
| LED light housing | Heat dissipation evaluation | | Temperature of heat-generating portion of LED member [° C.] | | | | After 10 min | — | — | — | — |
| | | | | | | | After 30 min | — | — | — | — |
| | | | | | | | After 1 hr | — | — | — | — |
| | | | | | | | After 24 hr | — | — | — | — |
| | | | | | | | After 1000 hr | — | — | — | — |
| | | | Temperature of housing member [° C.] | | | | After 10 min | — | — | — | — |
| | | | | | | | After 30 min | — | — | — | — |
| | | | | | | | After 1 hr | — | — | — | — |
| | | | | | | | After 24 hr | — | — | — | — |
| | | | | | | | After 1000 hr | — | — | — | — |

The results of Tables 1 to 5 demonstrate that a heat-dissipating resin composition according to an embodiment of the present invention has increased thermal conductivity, thermal emittance, volume-specific resistance, and lightness (L*) as well as excellent fire retardancy, low specific gravity, and superior molding processability. In addition, a heat-dissipating housing that is molded using a heat-dissipating resin composition according to an embodiment of the present invention is demonstrated to be suitable for a heat-dissipating housing for LED lighting.

<Determination Tests>

The following determination tests were used to carry out various evaluations.

Thermal conductivity was determined using a thermal conductivity measuring device (LFA447 Nanoflash), manufactured by NETZSCH, Ltd., according to ASTM E 1461. If the thermal conductivity was equal to or greater than 1.0 W/m·K, the sample passed the test.

Thermal emittance was determined using an emittance meter (D and S AERD) manufactured by KYOTO ELECTRONICS MANUFACTURING CO., LTD. A plate with a length of 90 mm×a width of 90 mm×a thickness of 2 mm that was prepared using an injection molder (IS50EPN), manufactured by TOSHIBA MACHINE CO., LTD., was used as a test piece for evaluation. If the thermal emittance was equal to or greater than 0.70, the plate passed the test.

Fire retardancy was tested according to the UL94 standard. If the fire retardancy was equal to or better than the grade V-1, the sample passed the test.

Specific gravity was measured according to JIS K 7112. If the specific gravity was equal to or lower than 2.50 g/cm³, the sample passed the test.

Lightness (L*) was determined according to JIS Z8729 by using a differential colorimeter (ZE6000), manufactured by NIPPON DENSHOKU INDUSTRIES CO., LTD. If the lightness was equal to or greater than 85, the sample passed the test.

Volume-specific resistance was measured according to JIS K 6911 by using an ultra-high resistance meter (R8340A), manufactured by ADVANTEST, Inc. If the volume-specific resistance was equal to or greater than $10^{12}$, the sample passed the test.

An injection moulder (FANUC ROBOSHOT S-2000i 50A), manufactured by MITSUBISHI HEAVY INDUSTRIES PLASTIC TECHNOLOGY CO., LTD., was used to manufacture an LED light housing as illustrated in FIG. 1. The molding processability was evaluated using four grades as follows.

Four-Grade Evaluation

Excellent (A): The moldability is good, and a beautiful white molded product is produced.

Good (B): The sample is moldable without any molding defect, but a filler patchy pattern appears.

Acceptable (C): The sample is moldable, but an unevenly-colored molded product with some flow marks is produced.

Not Acceptable (D): The sample cannot be molded, or a molded product with markedly poor appearance is produced.

Heat dissipation was evaluated according to the following procedure.

Figure 2:
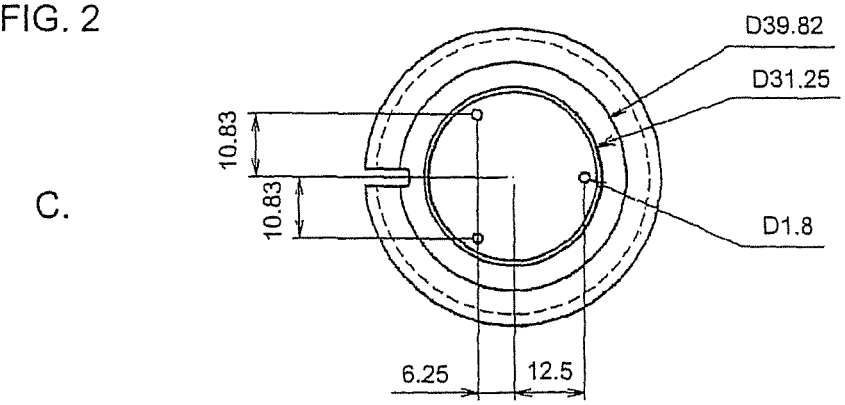
FIG. 2 illustrates a baseboard for mounting an LED lighting substrate.
Figure 2:
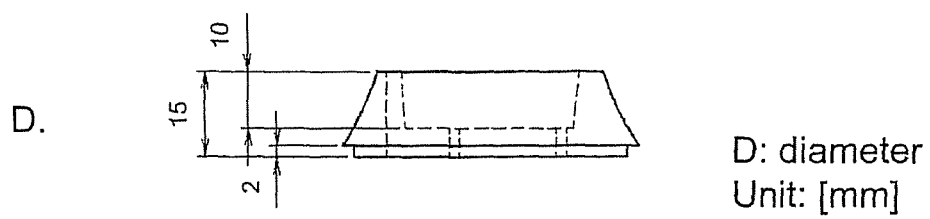
Figure 2:
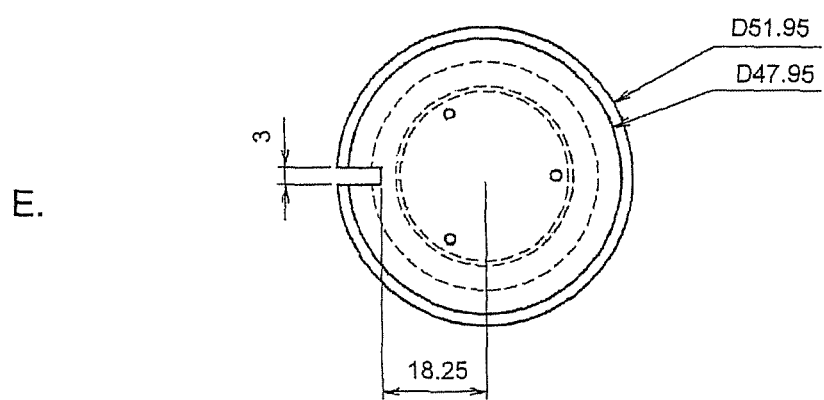
Figure 3:
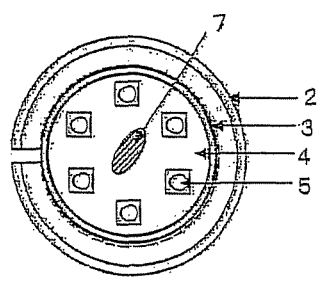
FIG. 3 illustrates how to evaluate heat dissipation by using the LED light housing as shown in FIG. 1 and the baseboard for mounting an LED lighting substrate as shown in FIG. 2.
Figure 3:
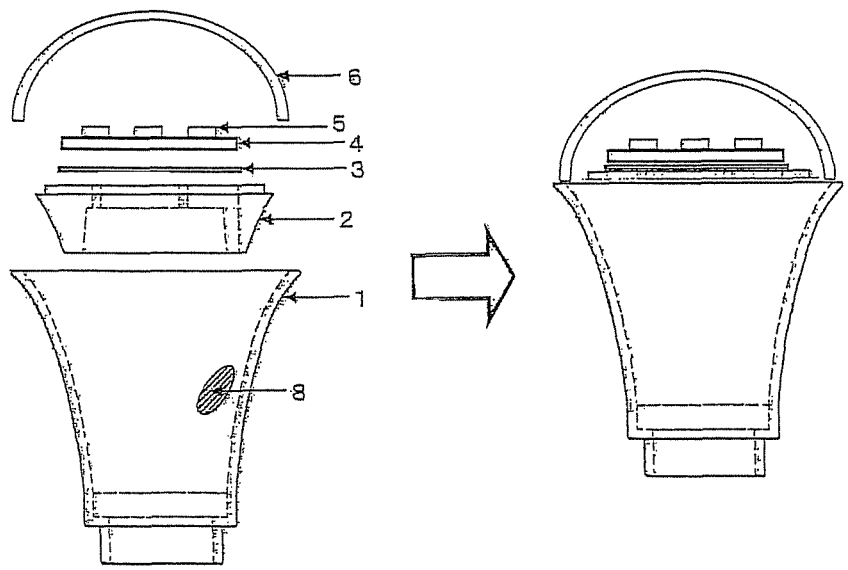

FIG. 1 illustrates an LED light housing 1. FIG. 2 illustrates a baseboard 2 for mounting an LED lighting substrate. These objects were produced using an injection moulder (FANUC ROBOSHOT S-2000i 50A) manufactured by MITSUBISHI HEAVY INDUSTRIES PLASTIC TECHNOLOGY CO., LTD. As illustrated in FIG. 3, the heat dissipation was evaluated using the following procedure. The baseboard 2 for mounting an LED lighting substrate was installed inside of the LED light housing 1. A gap between the interior of the housing and the side of the baseboard was coated and filled with a thermal grease (GFC-K4) manufactured by DENKI KAGAKU KOGYO KABUSHIKI KAISHA. Over the baseboard were tightly attached, in sequence, a heat conductive spacer 3 (FSL-100B) manufactured by DENKI KAGAKU KOGYO KABUSHIKI MISHA and an LED lighting substrate 4 (LDA8D-A1/D; the number of LEDs was 6; the power consumption was 7.6 W) manufactured by Panasonic Electric Works Co., Ltd. A transparent cover 6 (made of a polycarbonate resin) was placed over the top. In addition, thermocouples were attached to the center portion of the LED lighting substrate 4 (hereinafter, referred to as a heat-generating portion 7 of an LED member) and a housing member 8. The heat-generating portion 7 of the LED member and the housing member 8 had a temperature of 23° C. (room temperature of 23° C.). LED illumination was continuously emitted for 1000 hours. Then, temperatures of the heat-generating portion 7 of the LED member and the housing member 8 were measured after 10 minutes, 30 minutes, 1 hour, 24 hours, and 1000 hours. Accordingly, the heat dissipation was evaluated. The lower a temperature of the heat-generating portion 7 of the LED member is (the less the temperature increases), the less heat the LED accumulates. In addition, the lower a temperature of the housing member 8 is, the more heat is released into the air. This demonstrates superior heat dissipation. Also, the lower temperature of the housing member 8 can prevent accidents such as a burn due to contact with the housing member.

A heat-dissipating resin composition according to an embodiment of the present invention has increased thermal conductivity, thermal emittance, volume-specific resistance and lightness (L*) as well as excellent fire retardancy, low specific gravity, and superior molding processability. This enables a heat-dissipating housing that is produced by molding using a heat-dissipating resin composition according to an embodiment of the present invention to be suitably used for a housing for LED lighting.

1 LED light housing
2 Baseboard for mounting an LED lighting substrate
3 Heat conductive spacer
4 LED lighting substrate
5 Transparent cover
6 Position of attaching a thermocouple (heat-generating portion of an LED member)
7 Position of attaching a thermocouple (housing member)

The invention claimed is:

1. A heat-dissipating resin composition used for an LED light housing, comprising:
    100 parts by mass of a thermoplastic resin composition (X) comprising 40 to 65% by mass of a polyamide resin (A), 33.5 to 59.8% by mass of a metal-hydroxide-based fire retardant (B), and 0.2 to 1.5% by mass of a polytetrafluoroethylene resin (C); and
    5 to 200 parts by mass of an inorganic filler (Y) comprising 5 to 100% by mass of boron nitride (D) and 0 to 95% by mass of an inorganic oxide filler (E),
    wherein a thermal conductivity of the composition is equal to or greater than 1.0 W/m·K.

2. The heat-dissipating resin composition according to claim 1, wherein the boron nitride (D) has a volume-average particle diameter of from 5 to 25 μm as determined by a laser diffraction and scattering method.

3. The heat-dissipating resin composition according to claim 1, wherein the boron nitride (D) has a graphitization index (GI) of 4 or less as determined by powder X-ray diffractometry.

4. The heat-dissipating resin composition according to claim 1, wherein the inorganic filler (Y) comprises 10 to 90% by mass of the boron nitride (D) and 10 to 90% by mass of the inorganic oxide filler (E).

5. The heat-dissipating resin composition according to claim 4, wherein the inorganic oxide filler (E) has a volume-average particle diameter of from 0.1 to 1 μm as determined by a laser diffraction and scattering method.

6. The heat-dissipating resin composition according to claim 1, wherein the metal-hydroxide-based fire retardant (B) is magnesium hydroxide.

7. The heat-dissipating resin composition according to claim 1, wherein the inorganic oxide filler (E) is titanium oxide.

8. A heat-dissipating housing for LED lighting, comprising the heat-dissipating resin composition according to claim 1, wherein the housing is molded using the composition.

9. The heat-dissipating housing for LED lighting according to claim 8, wherein the housing is an injection molding product.

10. The heat-dissipating resin composition according to claim 2, wherein the boron nitride (D) has a graphitization index (GI) of 4 or less as determined by powder X-ray diffractometry.

11. The heat-dissipating resin composition according to claim 2, wherein the inorganic filler (Y) comprises 10 to 90% by mass of the boron nitride (D) and 10 to 90% by mass of the inorganic oxide filler (E).

12. The heat-dissipating resin composition according to claim 3, wherein the inorganic filler (Y) comprises 10 to 90% by mass of the boron nitride (D) and 10 to 90% by mass of the inorganic oxide filler (E).

13. The heat-dissipating resin composition according to claim 2, wherein the metal-hydroxide-based fire retardant (B) is magnesium hydroxide.

14. The heat-dissipating resin composition according to claim 3, wherein the metal-hydroxide-based fire retardant (B) is magnesium hydroxide.

15. The heat-dissipating resin composition according to claim 4, wherein the metal-hydroxide-based fire retardant (B) is magnesium hydroxide.

16. The heat-dissipating resin composition according to claim 5, wherein the metal-hydroxide-based fire retardant (B) is magnesium hydroxide.

17. A heat-dissipating housing for LED lighting, comprising the heat-dissipating resin composition according to claim 2, wherein the housing is molded using the composition.

18. A heat-dissipating housing for LED lighting, comprising the heat-dissipating resin composition according to claim 3, wherein the housing is molded using the composition.

19. A heat-dissipating housing for LED lighting, comprising the heat-dissipating resin composition according to claim 4, wherein the housing is molded using the composition.

20. A heat-dissipating housing for LED lighting, comprising the heat-dissipating resin composition according to claim 5, wherein the housing is molded using the composition.

21. A heat-dissipating housing for LED lighting, comprising the heat-dissipating resin composition according to claim 6, wherein the housing is molded using the composition.

22. A heat-dissipating housing for LED lighting, comprising the heat-dissipating resin composition according to claim 7, wherein the housing is molded using the composition.

* * * * *